Patented July 16, 1940

2,208,442

UNITED STATES PATENT OFFICE 2,208,442

PURIFYING RUBBER HYDROHALIDES

Herbert A. Winkelmann, Chicago, Ill., assignor to Marbon Corporation, Chicago, Ill., a corporation of Delaware No Drawing. Application April 29, 1937, Serial No. 139,738

3 Claims. (Cl. 260—771)

This invention relates to the manufacture of rubber hydrohalides, and more particularly to a method of purifying rubber hydrohalides.

I have discovered that iron compounds have a very detrimental effect on the properties of rubber hydrochloride. In my copending application Serial No. 113,465 I have disclosed and claimed methods of obtaining high grade rubber hydrochloride from scrap rubber and reclaim by removing zinc and iron compounds from the scrap rubber prior to reaction with hydrogen chloride. I have, however, discovered that iron compounds may be introduced into the rubber hydrochloride during its treatment and must therefore be removed from the rubber hydrochloride itself. This removal of iron compounds is highly important when the rubber hydrochloride is exposed to heat such as is present during drying, milling, calendering, and molding. I have found that when iron is present even in small amounts, the effect of heat is to discolor the product, reduce the tensile strength, and increase the water and oil absorption. It is apparent that for the production of light colored high grade calendered or molded products, the removal of iron is practically essential.

It is of course possible to eliminate trouble due to iron by using non-ferrous equipment throughout the manufacture and treatment of rubber hydrochloride. However, the substituting of other materials for iron is often impractical and sometimes does not always eliminate discoloration and other harmful effects. Zinc and copper have a similar harmful effect as iron. Moreover, an important stage in the manufacture of products from rubber hydrochloride is the grinding or shredding of rubber hydrochloride sheets. The blades must withstand terrific shock and therefore are generally made of steel or ferrous alloys. During the shredding of the sheets, I have found that iron in considerable quantities is introduced into the rubber hydrochloride. This is likewise true of other compounds such as zinc or copper when the blades of the shredder contain these materials.

The introduction of harmful metallic compounds into the rubber hydrochloride during the shredding is not only due to the abrasive action of the blades on the rubber hydrochloride, but is also due to the presence of acid water in the rubber hydrochloride. In order to reduce the corrosive action of the acid and also to reduce the temperature during shredding, a stream of water is run through the shredder during its operation. I prefer to use water for this purpose which is only sufficiently acid as to prevent the formation of basic iron compounds. Water of a pH of about 6.0 has been found satisfactory. In this manner the introduction of insoluble basic compounds is prevented, and the ferric chloride and other harmful chlorides may be readily removed by washing with water. However, corrosion and the formation of compounds such as iron chloride is increased by using acid water in the shredder. Therefore, I may instead flow a stream of water through the apparatus which is neutral or slightly alkaline. In this case iron in the form of iron oxide is introduced into the rubber hydrochloride. I then prefer to remove the shredded rubber hydrochloride from the shredder and wash it out of contact with ferrous materials by means of an acid wash until it is substantially free from iron and other harmful metallic compounds. For this purpose, I use first a wash of 30% hydrochloric acid to convert the iron oxide to iron chloride. I agitate the shredded material with this acid for ten minutes and drain off the acid containing dissolved salts and then the rubber hydrochloride is washed with water which is neutral or only slightly acid, the wash being continued until tests show that the rubber hydrochloride contains less than .015% iron.

The following procedure will illustrate the manufacture of white or colorless molded masses of rubber hydrochloride.

Pale crepe sheets of .02" thickness are corrugated and wound into a roll. Due to the corrugation the roll consists of spaced sheet rubber. This roll is dipped into liquefied hydrogen chloride at —85° C. for about five minutes. The roll is thus converted into a white colored amorphous rubber hydrochloride. The roll of rubber hydrochloride is degassed and dipped into water to remove excess hydrogen chloride. It is then put into a shredding machine which shreds the rubber hydrochloride into a coarse fibrous powder. During the shredding operation, water is run through the shredder. After the shredding operation the rubber hydrochloride is removed and washed until tests for iron compounds show that they are present in less than .015%. The washed rubber hydrochloride is then dried at a temperature of about 100° F. After drying, it is milled with a basic stabilizer such as magnesium oxide, litharge, or hexamethylenetetramine, together with any other fillers, resins, plasticizers, and the like which it may be desired to use. Care is taken that iron chloride or other harmful compounds such as zinc chloride or copper chloride are not introduced during the milling. After the materials are intimately admixed, the composition is calendered into sheets, the sheets cut to size, and molded into shaped articles of manufacture.

In support of the many statements as to the effect of iron on rubber hydrochloride, the following tests are submitted:

|  | Percent chlorine | Tensile | Elongation | Set | P & J hardness |
|---|---|---|---|---|---|
| Stabilized Marbon R | 31.4 | 5820 | 10 |  | 3 |
| Stabilized Marbon R plus .75% FeCl₃ | 30.6 | 2730 | 167 | 9 | 10 |

*Kerosene absorption, 48 hours at 70° C.*

|  | Percent weight increase | Percent volume increase |
|---|---|---|
| Stabilized Marbon R | 3.8 | 0.0 |
| Stabilized Marbon R plus .75% FeCl₃ | 18.0 | 24.5 |

*Water absorption*

|  | 1 day at 70° C. | | 30 days at 70° C. | |
|---|---|---|---|---|
|  | Percent weight increase | Percent volume increase | Percent weight increase | Percent volume increase |
| Stabilized Marbon R | 0.32 |  | 2.16 |  |
| Stabilized Marbon R plus .75% FeCl₃ | 1.06 | 1.89 | 5.85 | 1.89 |

The above tests were carried out on compositions which had been milled and then molded at 268° F. for three minutes. The stabilized Marbon R consists of 100 parts by weight of rubber hydrochloride obtained by reacting sheet rubber at about room temperature with gaseous hydrogen chloride, 10 parts of magnesium oxide, and 2 parts of hexamethylenetetramine.

It is to be understood that not only may iron and zinc compounds be removed from rubber hydrochloride in which such compounds are introduced during the treatment of the rubber hydrochloride, but the iron and zinc compounds may advantageously be removed from rubber hydrochloride made from scrap rubber or reclaim in which these compounds have been introduced into the rubber prior to reaction with hydrogen chloride. Scrap vulcanized rubber or reclaim containing zinc oxide and/or iron oxide may be reacted with hydrogen chloride by the usual methods to produce rubber hydrochloride. During the reaction considerable of the zinc oxide and/or iron oxide is converted to the chloride, but by using substantially anhydrous hydrogen chloride and rubber the amount of hydrogen chloride used for this purpose is considerably lessened. The resulting rubber hydrochloride containing iron and/or zinc compounds is then shredded or ground, and then washed with acid to remove the iron and/or zinc. Concentrated hydrochloric acid may suitably be used as a wash. A wash of dilute sulfuric acid may be used with some advantage over hydrochloric acid since zinc or iron sulphate are less harmful than zinc oxide, zinc chloride, or iron chloride. The rubber hydrochloride which is thus made substantially free from deleterious iron and/or zinc compounds may be dried, milled and molded without harmful effect on the product. The results, however, are not as satisfactory as when the deleterious zinc or iron compounds are removed from the rubber prior to reaction with hydrogen chloride.

I claim:

1. The method which comprises washing rubber hydrochloride which contains a substantial amount of iron until the rubber hydrochloride is substantially free from iron, and thereafter subjecting said rubber hydrochloride to heat and positive pressure in the presence of a basic stabilizer to produce milled, calendered, molded or like products.

2. The method which comprises washing rubber hydrochloride which contains a substantial amount of zinc until the rubber hydrochloride is substantially free from zinc, and thereafter subjecting said rubber hydrochloride to heat and positive pressure in the presence of a basic stabilizer to produce milled, calendered, molded or like products.

3. The method which comprises washing rubber hydrochloride which contains a substantial amount of one or more substances from the group consisting of iron, zinc, and copper, until the rubber hydrochloride is substantially free from said substances, and thereafter subjecting said rubber hydrochloride to heat and positive pressure in the presence of a basic stabilizer to produce milled, calendered, molded or like products.

HERBERT A. WINKELMANN.